(12) United States Patent
Kim

(10) Patent No.: US 12,362,657 B2
(45) Date of Patent: Jul. 15, 2025

(54) DC-DC CONVERTER

(71) Applicant: LG ENERGY SOLUTION, LTD., Seoul (KR)

(72) Inventor: Byeong Geon Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/274,428

(22) PCT Filed: Nov. 1, 2022

(86) PCT No.: PCT/KR2022/016944
§ 371 (c)(1),
(2) Date: Jul. 26, 2023

(87) PCT Pub. No.: WO2023/120955
PCT Pub. Date: Jun. 29, 2023

(65) Prior Publication Data
US 2024/0106324 A1    Mar. 28, 2024

(30) Foreign Application Priority Data

Dec. 20, 2021   (KR) .................. 10-2021-0182457

(51) Int. Cl.
*H02M 1/32* (2007.01)
*H02M 1/34* (2007.01)

(52) U.S. Cl.
CPC ..................... *H02M 1/34* (2013.01)

(58) Field of Classification Search
CPC .......... H02M 1/32; H02M 1/34; H02M 1/342; H02M 1/344; H02M 1/346; H02M 1/348
See application file for complete search history.

(56) References Cited

U.S. PATENT DOCUMENTS

| 9,768,678 | B1 | 9/2017 | Stanley |
| 9,973,076 | B1 | 5/2018 | Stanley |
| 10,910,940 | B2* | 2/2021 | Evans .................. H02M 1/348 |

(Continued)

FOREIGN PATENT DOCUMENTS

| CN | 106953511 A | 7/2017 |
| JP | 5-276654 A | 10/1993 |

(Continued)

OTHER PUBLICATIONS

Extended European Search Report for European Application No. 22911593.6, dated Jun. 25, 2024.

(Continued)

*Primary Examiner* — Adolf D Berhane
(74) *Attorney, Agent, or Firm* — Birch, Stewart, Kolasch & Birch, LLP

(57) ABSTRACT

Discussed is an electric power converter that may include an integrated circuit having at least one power transistor and a snubber circuit connected in parallel to the at least one power transistor; and a selection resistor connected between a power supply voltage supplied to the integrated circuit and the snubber circuit, in which the snubber circuit includes at least two snubbers, and each of the at least two snubbers includes a resistor connected in series, a first transistor, and a capacitor, and the selection resistor is connected to a gate of the first transistor of any one of the at least two snubbers.

12 Claims, 5 Drawing Sheets

(56) References Cited

U.S. PATENT DOCUMENTS

| | | |
|---|---|---|
| 2018/0138808 A1 | 5/2018 | Stanley |
| 2018/0166973 A1 | 6/2018 | Luerkens et al. |
| 2018/0262100 A1 | 9/2018 | Stanley |
| 2020/0204062 A1 | 6/2020 | Ikeda |
| 2020/0266701 A1 | 8/2020 | Yoon et al. |
| 2020/0395842 A1 | 12/2020 | Evans et al. |
| 2024/0235380 A1* | 7/2024 | Jing .................. H03K 17/0822 |

FOREIGN PATENT DOCUMENTS

| | | |
|---|---|---|
| JP | 8-250310 A | 9/1996 |
| JP | 5138002 B2 | 2/2013 |
| JP | 2013-246896 A | 12/2013 |
| JP | 5742227 B2 | 7/2015 |
| JP | 6509381 B2 | 5/2019 |
| JP | 2019-135899 A | 8/2019 |
| JP | 2020-103008 A | 7/2020 |
| JP | 2021-40462 A | 3/2021 |
| KR | 10-1239801 B1 | 3/2013 |
| KR | 10-2019-0073438 A | 6/2019 |
| KR | 10-2140951 B1 | 8/2020 |
| WO | WO 2017/082885 A1 | 5/2017 |

OTHER PUBLICATIONS

International Search Report for PCT/KR2022/016944 mailed on Feb. 9, 2023.

* cited by examiner

[Figure 1]
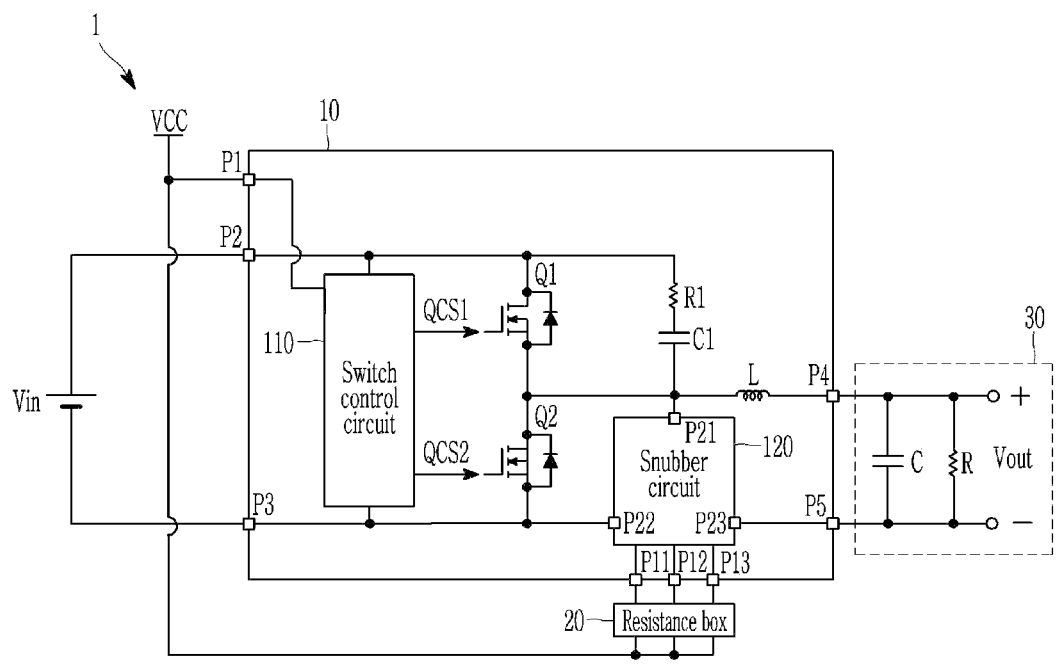

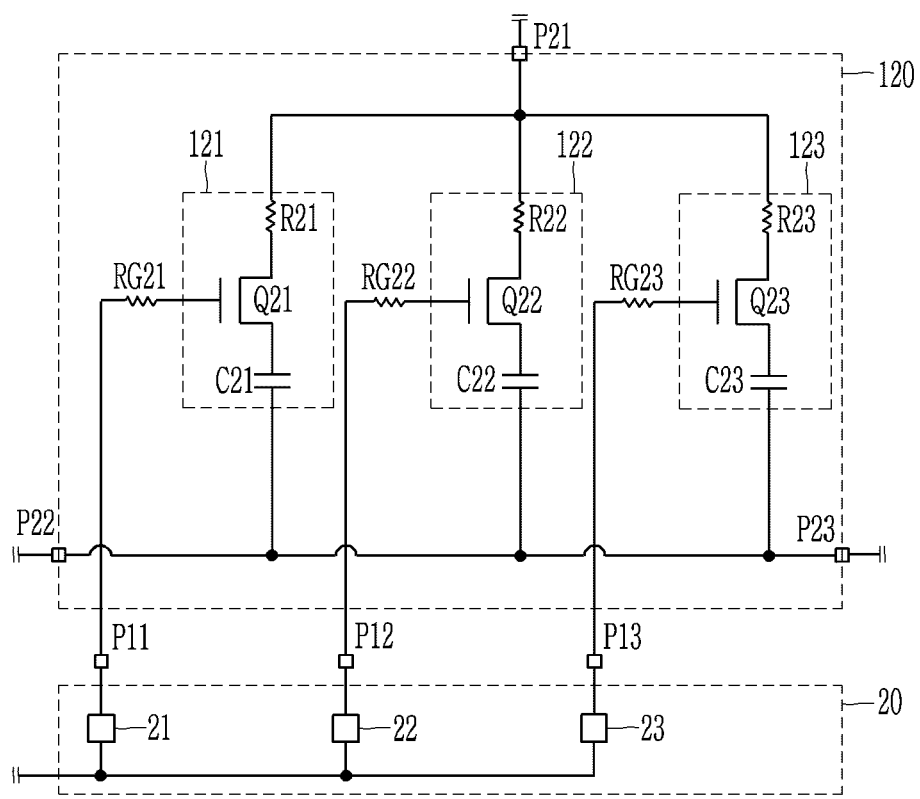
[Figure 2]

[Figure 3]
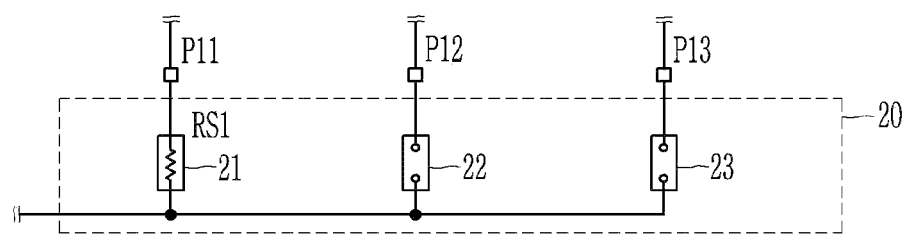

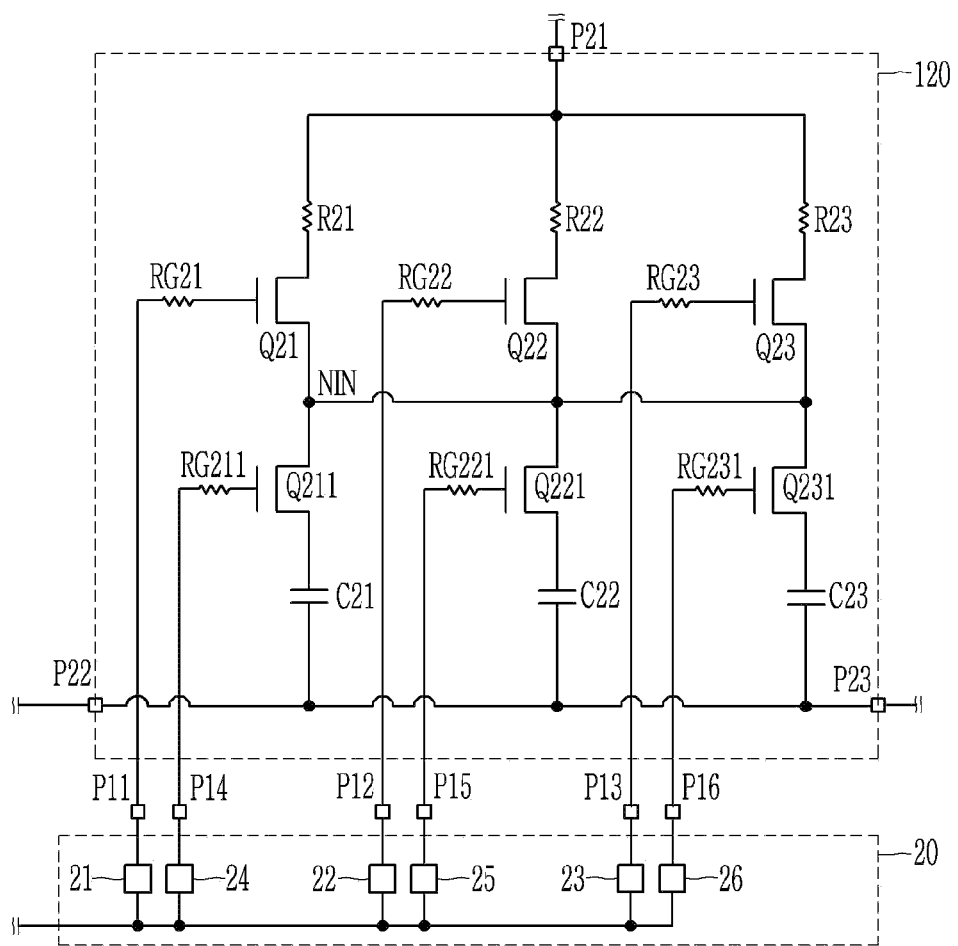
【Figure 4】

【Figure 5】
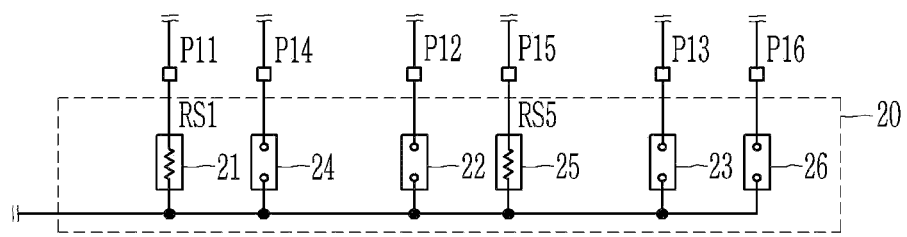
【Figure 6】
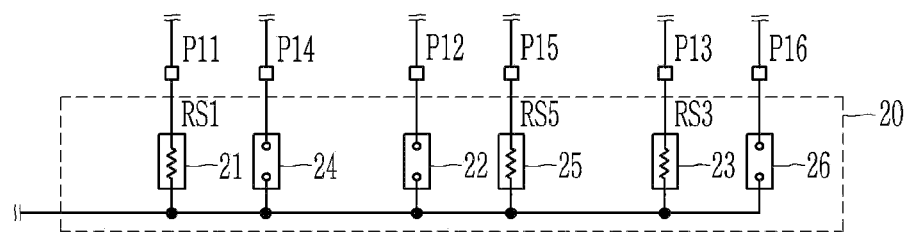
【Figure 7】
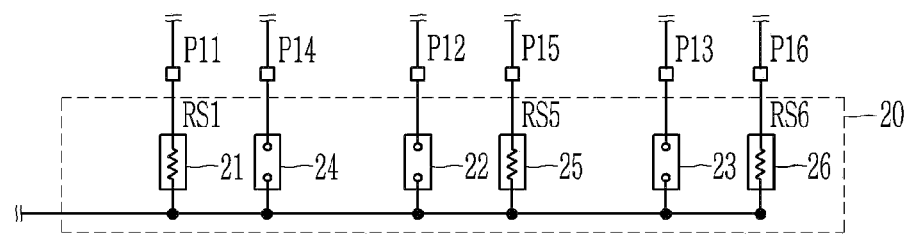

DC-DC CONVERTER

CROSS-REFERENCE TO RELATED PATENT APPLICATIONS

This application claims priority to Korean Patent Application No. 10-2021-0182457 dated Dec. 20, 2021, all contents of which are hereby incorporated by reference into the present application.

The present disclosure relates to a DC-DC (direct current-direct current) converter.

BACKGROUND ART

Technical Field

The DC-DC converter converts an input voltage and supplies an output voltage having a required voltage level. In the DC-DC converter, a transient voltage may be generated according to voltage switching. A snubber circuit may be applied to the DC-DC converter to prevent component damage due to transient voltage and to remove EMI radiation noise.

In order to remove noise, it is necessary to optimize the snubber circuit by changing and designing a snubber value such as resistance and capacitance of the snubber circuit, and when the snubber circuit is embedded in an IC device, it is difficult to change the snubber value of the snubber circuit unless the IC device is replaced.

DISCLOSURE

Technical Problem

In a DC-DC converter including a snubber circuit, when the snubber circuit is embedded in an IC device, a DC-DC converter capable of variably applying a snubber value is provided.

Technical Solution

According to a feature of the present invention, an electric power converter includes an integrated circuit including at least one power transistor and a snubber circuit connected in parallel to the at least one power transistor, and a selection resistor connected between a power supply voltage supplied to the integrated circuit and the snubber circuit, in which the snubber circuit includes at least two snubbers, and each of the at least two snubbers includes a resistor, a first transistor, and a capacitor connected in series, and the selection resistor is connected to a gate of the first transistor of any one of the at least two snubbers.

The first transistor of any one of the at least two snubbers may be turned on by the power supply voltage supplied through the selection resistor.

The first transistor of the remaining snubber except any one of the at least two snubbers may be turned off.

The integrated circuit may further include a switch control circuit configured to receive the power supply voltage and control a switching operation of the at least one power transistor.

According to another aspect of the present invention, there is provided an electric power converter including: an integrated circuit including at least one power transistor and a snubber circuit connected in parallel to the at least one power transistor; and at least two selection resistors connected between a power supply voltage supplied to the integrated circuit and the snubber circuit, in which the snubber circuit includes at least two resistors, at least two first transistors connected in series to the at least two resistors, respectively, at least two capacitors, and at least two second transistors connected in series to the at least two capacitors, respectively, and a first selection resistor of the at least two selection resistors is connected to a gate of a first transistor connected in series to any one of the at least two resistors, and a second selection resistor of the at least two selection resistors is connected to a gate of a second transistor connected in series to any one of the at least two capacitors.

A first transistor connected in series to any one of the at least two resistors may be turned on by the power supply voltage supplied through the first selection resistor, and a second transistor connected in series to any one of the at least two capacitors may be turned on by the power supply voltage supplied through the second selection resistor.

The first transistor connected in series to the remaining resistors except any one of the at least two resistors may be turned off, and the second transistor connected in series to the remaining capacitors except any one of the at least two capacitors may be turned off.

The integrated circuit may further include a switch control circuit configured to receive the power supply voltage and control the at least one power transistor.

The at least two selection resistors may include a third selection resistor that may be connected to a gate of a first transistor connected in series to another of the at least two resistors, and a resistance value of the snubber circuit may be a parallel synthesis resistance of one of the at least two resistors and another resistor.

The at least two selection resistors may include a third selection resistor that may be connected to a gate of a second transistor connected in series to another of the at least two capacitors, and a capacitance value of the snubber circuit may be a parallel synthesis capacitance of one of the at least two capacitors and another capacitor.

The electric power converter may be a DC-DC converter.

Advantageous Effects

According to the present disclosure, in a DC-DC converter including a snubber circuit, when the snubber circuit is embedded in an IC device, a DC-DC converter capable of selectively configuring a snubber circuit among a plurality of snubbers or variably applying a resistance value and a capacitance of the snubber circuit may be provided.

DESCRIPTION OF THE DRAWINGS

FIG. 1 is a block diagram schematically illustrating a converter according to an exemplary embodiment.

FIG. 2 is a circuit diagram illustrating an example of implementing a snubber circuit and a resistance box according to an exemplary embodiment.

FIG. 3 is a circuit diagram illustrating an example of a resistance box according to an exemplary embodiment.

FIG. 4 is a circuit diagram illustrating an example of implementing a snubber circuit and a resistance box according to an exemplary embodiment.

FIG. 5 is a circuit diagram illustrating an example of a resistance box according to an exemplary embodiment.

FIG. 6 is a circuit diagram illustrating an example of a resistance box according to an exemplary embodiment.

FIG. 7 is a circuit diagram illustrating an example of a resistance box according to an exemplary embodiment.

MODE FOR INVENTION

Hereinafter, exemplary embodiments disclosed in the present specification will be described in detail with reference to the accompanying drawings, in which the same or similar components are given the same or similar reference numerals, and redundant descriptions thereof will be omitted. In the following description, the suffix "module" and/or "unit" for the constituent elements are given or mixed in consideration of the ease of description only, and do not have meanings or roles that are distinguished from each other. In addition, in describing the exemplary embodiments disclosed in the present specification, when it is determined that the detailed description of the related known technology may obscure the gist of the exemplary embodiments disclosed in the present specification, the detailed description thereof will be omitted. In addition, the accompanying drawings are merely provided to easily understand the exemplary embodiments disclosed in the present specification, and the technical spirit disclosed in the present specification is not limited by the accompanying drawings, and it should be understood that all changes, equivalents, and substitutes included in the spirit and technical scope of the present invention are included.

Terms including ordinal numbers such as first, second, etc. may be used to describe various elements, but the elements are not limited by the terms. The terms are used only for the purpose of distinguishing one component from another component.

In the present application, it should be understood that the term "include" or "have" indicates that a feature, a number, a step, an operation, a component, a part, or a combination thereof described in the specification is present, but does not exclude the possibility of presence or addition of one or more other features, numbers, steps, operations, components, parts, or combinations thereof in advance.

FIGS. 1 to 7 illustrate a converter circuit for converting an input DC voltage into a DC voltage, which allows a snubber circuit to be variously configured.

FIG. 1 is a block diagram schematically illustrating a converter according to an exemplary embodiment.

The converter 1 may DC-DC-convert an input voltage Vin and output an output voltage Vout. The converter 1 may include an integrated circuit (IC) 10, a resistance box 20, and an output unit 30. The converter 1 may be mounted on a printed circuit board (PCB).

The power supply voltage VCC may be supplied to the IC 10 through the terminal P1, and the power supply voltage VCC may be supplied to the resistance box 20.

The input voltage Vin may be supplied to the IC 10 through the terminal P2. The IC 10 may DC-DC-convert an input voltage Vin and transmit an output voltage to the output unit 30 through a terminal P4 and a terminal P5. The input voltage Vin may be connected to the terminals P2 and P3.

The resistance box 20 may select a configuration of the IC 10 through the plurality of selection terminals P11 to P13. Although FIG. 1 illustrates that the IC 10 includes three selection terminals P11 to P13, the disclosure is not limited thereto, and the IC 10 may be implemented to include two or more selection terminals.

The IC 10 may convert an input voltage through a plurality of transistors and a switch control circuit. The IC 10 may include a switch control circuit 110, a first power transistor Q1, a first resistor R1, a first capacitor C1, a second power transistor Q2, a snubber circuit 120, and an inductor L.

The switch control circuit 110 may generate transistor control signals QCS1 and QCS2 for controlling switching operations of the first and second power transistors Q1 and Q2 by using the power supply voltage VCC input through the terminal P1 as a power source. Switching operations of the first power transistor Q1 and the second power transistor Q2 may be controlled according to transistor control signals QCS1 and QCS2 supplied from the switch control circuit 110.

The first resistor R1 and the first capacitor C1 are connected to each other in series, and are connected to the first power transistor Q1 in parallel. One end of the first power transistor Q1 is connected to one end of the switch control circuit 110. The other end of the first power transistor Q1 is connected to a node to which one end of the second power transistor Q2, a terminal P21 of the snubber circuit 120, and one end of the inductor L are connected. The other end of the second power transistor Q2 is connected to a node to which the other end of the switch control circuit 110 and the terminal P22 of the snubber circuit 120 are connected. Terminal P23 of snubber circuit 120 is connected to terminal P5 of IC 10. The other end of the inductor L is connected to a terminal P4, and a terminal P23 of the snubber circuit 120 is connected to a terminal P5.

The output unit 30 may include a capacitor C and a load R. In the output unit 30, one end of the output voltage Vout is connected to a node to which one end of the capacitor C and one end of the load R are connected, and the other end of the output voltage Vout is connected to a node to which the other end of the capacitor C and the other end of the load R are connected.

The on-level of the transistor control signals QCS1 and QCS2 is a high level, and the off-level thereof is a low level. When the first power transistor Q1 is turned on and the second power transistor Q2 is turned off by the transistor control signal QCS1 of the high level and the transistor control signal QCS2 of the low level, the input voltage Vin is supplied to the inductor L so that the current flowing through the inductor L may increase. When the first power transistor Q1 is turned off and the second power transistor Q2 is turned on by the transistor control signal QCS1 of the low level and the transistor control signal QCS2 of the high level, the current flowing through the inductor L may decrease while flowing through the second power transistor Q2. A current flowing through the inductor L may be supplied to the load R, and the output voltage Vout may be smoothed to a constant level by the capacitor C. The switch control circuit 110 may sense the output voltage Vout and may control switching operations of the first and second power transistors Q1 and Q2 so that the output voltage Vout may be maintained at a predetermined level.

Hereinafter, the operation of the snubber circuit 120 according to the internal circuit configuration of the resistance box 20 will be described with reference to FIGS. 2 and 3.

FIG. 2 is a circuit diagram illustrating an example of implementing a snubber circuit and a resistance box according to an exemplary embodiment.

The snubber circuit according to an example illustrated in FIG. 2 may operate in a snubber unit in which a resistor, a capacitor, and a transistor are connected in series.

The snubber circuit 120 may include a first snubber 121, a second snubber 122, a third snubber 123, and a plurality of gate resistors RG21 to RG23. The first snubber 121 may include a resistor R21, a capacitor C21, and a transistor Q21, the second snubber 122 may include a resistor R22, a capacitor C22, and a transistor Q22, and the third snubber 123 may include a resistor R23, a capacitor C23, and a transistor Q23.

Although FIG. 2 illustrates that the snubber circuit 120 includes three snubbers 121 to 123, the present disclosure is not limited thereto, and the snubber circuit 120 may be implemented as including two or more snubbers. As illustrated in FIG. 2, the number of selection terminals P11 to P13 may be increased or decreased based on the number of snubbers included in the snubber circuit 120.

One end of the first snubber 121, one end of the second snubber 122, and one end of the third snubber 123 are connected to a terminal P21, and the other end of the first snubber 121, the other end of the second snubber 122, and the other end of the third snubber 123 are connected to a node to which the terminal P22 and the terminal P23 are connected.

The terminal P21 is connected to a node to which one end of the resistor R21, one end of the resistor R22, and one end of the resistor R23 are connected.

The other end of the resistor R21 is connected to one end of the transistor Q21. The other end of the transistor Q21 is connected to one end of the capacitor C21. One end of the gate resistor RG21 is connected to the gate end of the transistor Q21, and the other end of the gate resistor RG21 is connected to the selection terminal P11.

The other end of the resistor R22 is connected to one end of the transistor Q22. The other end of the transistor Q22 is connected to one end of the capacitor C22. One end of the gate resistor RG22 is connected to the gate end of the transistor Q22, and the other end of the gate resistor RG22 is connected to the selection terminal P12.

The other end of the resistor R23 is connected to one end of the transistor Q23. The other end of the transistor Q23 is connected to one end of the capacitor C23. One end of the gate resistor RG23 is connected to the gate end of the transistor Q23, and the other end of the gate resistor RG23 is connected to the selection terminal P13.

The other end of the capacitor C21, the other end of the capacitor C22, and the other end of the capacitor C23 are connected to the node to which the terminal P22 and the terminal P23 are connected.

The snubber circuit 120 according to the exemplary embodiment illustrated in FIG. 2 may operate through at least one selected from among the first snubber 121, the second snubber 122, and the third snubber 123 according to the configuration of the resistance box 20.

The resistance box 20 may include a plurality of individual resistance boxes 21 to 23. In FIG. 2, the resistance box 20 is illustrated as including three individual resistance boxes 21 to 23, but the present disclosure is not limited thereto, and the resistance box 20 may be implemented as including two or more individual resistance boxes. The number of individual resistance boxes may be increased or decreased based on the number of selection terminals P11 to P13.

Each of a plurality of individual resistance boxes 21 to 23 may include a selection resistor. Alternatively, each of a plurality of individual resistance boxes 21 to 23 may be an open circuit. Hereinafter, a resistance box that does not include the selection resistor among the plurality of individual resistance boxes 21 to 23 will be described as being open.

Hereinafter, an exemplary embodiment of the individual resistance boxes 21 to 23 included in the resistance box 20 will be described with reference to FIG. 3.

FIG. 3 is a circuit diagram illustrating an example of a resistance box according to an exemplary embodiment.

In the example of FIG. 3, the selection resistor RS1 is included in the individual resistance box 21, and the selection resistor is not included in the remaining individual resistance boxes 22 and 23.

The power supply voltage VCC supplied to the resistance box 20 may supply a current to a corresponding selection terminal (e.g., P11) among the plurality of selection terminals P11 to P13 through an individual resistance box (e.g., 21) including a selection resistor among the plurality of individual resistance boxes 21 to 23.

In the converter 1 using the snubber circuit 120 and the resistance box 20 of FIGS. 2 and 3, the transistor Q21 is turned on by the power supply voltage VCC supplied through the resistor RS1 and the resistor RG21. When the transistor Q21 is turned on, the first snubber 121 is connected in parallel to the second power transistor Q2. That is, the first snubber 121 may operate with respect to a transient voltage that may occur during a switching operation of the second power transistor Q2.

When the transistor Q21 is turned on, the resistance value of the snubber circuit 120 may be the resistance value of the resistor R21, and the capacitance of the snubber circuit 120 may be determined as the capacitance of the capacitor C21.

Hereinafter, an operation of the snubber circuit 120 according to an internal circuit configuration of the resistance box 20 capable of controlling a resistor and a capacitor of the snubber, respectively, will be described with reference to FIGS. 4 to 7.

FIG. 4 is a circuit diagram illustrating an example of implementing a snubber circuit and a resistance box according to an exemplary embodiment.

The snubber circuit according to an exemplary embodiment illustrated in FIG. 4 may not operate in a snubber unit, unlike the snubber circuit according to an exemplary embodiment illustrated in FIG. 2.

The snubber circuit 120 may include a plurality of resistors R21 to R23, a plurality of capacitors C21 to C23, a plurality of transistors Q21 to Q23, Q211, Q221, and Q231, and a plurality of gate resistors RG21 to RG23, RG211, RG221, and RG231.

The terminal P21 is connected to a node to which one end of the resistor R21, one end of the resistor R22, and one end of the resistor R23 are connected.

The other end of the resistor R21 is connected to one end of the transistor Q21. One end of the gate resistor RG21 is connected to the gate end of the transistor Q21, and the other end of the gate resistor RG21 is connected to the selection terminal P11. One end of the transistor Q211 is connected to one end of the capacitor C21. One end of the gate resistor RG211 is connected to the gate end of the transistor Q211, and the other end of the gate resistor RG211 is connected to the selection terminal P14.

The other end of the resistor R22 is connected to one end of the transistor Q22. One end of the gate resistor RG22 is connected to the gate end of the transistor Q22, and the other end of the gate resistor RG22 is connected to the selection terminal P12. One end of the transistor Q221 is connected to one end of the capacitor C22. One end of the gate resistor RG221 is connected to the gate end of the transistor Q221, and the other end of the gate resistor RG221 is connected to the selection terminal P15.

The other end of the resistor R23 is connected to one end of the transistor Q23. One end of the gate resistor RG23 is connected to the gate end of the transistor Q23, and the other end of the gate resistor RG23 is connected to the selection terminal P13. One end of the transistor Q231 is connected to one end of the capacitor C23. One end of the gate resistor RG231 is connected to the gate end of the transistor Q231, and the other end of the gate resistor RG231 is connected to the selection terminal P16.

The other end of the transistor Q21, the other end of the transistor Q211, the other end of the transistor Q22, the other end of the transistor Q221, the other end of the transistor Q23, and the other end of the transistor Q231 are connected to the node NN.

The other end of the capacitor C21, the other end of the capacitor C22, and the other end of the capacitor C23 are connected to the node to which the terminal P22 and the terminal P23 are connected.

The snubber circuit 120 according to the exemplary embodiment illustrated in FIG. 4 may operate through at least one selected according to the configuration of the resistance box 20 among the plurality of resistors R21 to R23 and at least one selected according to the configuration of the resistance box 20 among the plurality of capacitors C21 to C23.

The resistance box 20 may include a plurality of individual resistance boxes 21 to 26. In FIG. 4, the resistance box 20 is illustrated as including six individual resistance boxes 21 to 26, and the number of selection terminals P11 to P16 is illustrated as six.

Each of a plurality of individual resistance boxes 21 to 26 may include a selection resistor. Alternatively, each of a plurality of individual resistance boxes 21 to 26 may be an open circuit. Hereinafter, a resistance box that does not include the selection resistor among the plurality of individual resistance boxes 21 to 26 will be described as being open.

Hereinafter, an exemplary embodiment of the individual resistance boxes 21 to 26 included in the resistance box 20 will be described with reference to FIG. 5.

FIG. 5 is a circuit diagram illustrating an example of a resistance box according to an exemplary embodiment.

In the example of FIG. 5, the individual resistance box 21 includes the selection resistor RS1, the individual resistance box 25 includes the selection resistor RS5, and the remaining individual resistance boxes 22 to 24 and 26 do not include the selection resistor.

The power supply voltage VCC supplied to the resistance box 20 may supply a current to a corresponding one of the plurality of selection terminals P11 to P16 (e.g., P11 and P15) through an individual resistance box (e.g., 21 and 25) including a selection resistor among the plurality of individual resistance boxes 21 to 26.

In the converter 1 using the snubber circuit 120 and the resistance box 20 of FIGS. 4 and 5, the transistor Q21 is turned on by the power supply voltage VCC supplied through the resistor RS1 and the resistor RG21, and the transistor Q221 is turned on by the power supply voltage VCC supplied through the resistor RS5 and the resistor RG221. The resistor R21 and the capacitor C22 are connected in parallel to the second power transistor Q2 by the transistor Q21 and the transistor Q221 being turned on.

By the transistor Q21 and the transistor Q221 being turned on, the resistance value of the snubber circuit 120 may be the resistance value of the resistor R21, and the capacitance of the snubber circuit 120 may be determined as the capacitance of the capacitor C22.

Also, in the converter 1 using the snubber circuit 120 of FIG. 4, the resistance value of the snubber circuit 120 may be determined as a composite resistance using a plurality of resistors, or the capacitance of the snubber circuit 120 may be determined as a composite capacitance using a plurality of capacitors.

Hereinafter, an exemplary embodiment of a resistance box that allows the snubber circuit 120 to have a composite resistance or a composite capacitance will be described with reference to FIGS. 6 and 7.

FIG. 6 is a circuit diagram illustrating an example of a resistance box according to an exemplary embodiment.

In the example of FIG. 6, the individual resistance box 21 includes the selection resistor RS1, the individual resistance box 23 includes the selection resistor RS3, the individual resistance box 25 includes the selection resistor RS5, and the remaining individual resistance boxes 22, 24, and 26 do not include the selection resistor.

The power supply voltage VCC supplied to the resistance box 20 may supply a current to a corresponding selection terminal (e.g., P11, P13, and P15) among the plurality of selection terminals P11 to P16 through an individual resistance box (e.g., 21, 23, and 25) including a selection resistor among the plurality of individual resistance boxes 21 to 26.

In the converter 1 using the snubber circuit 120 and the resistance box 20 of FIGS. 4 and 6, the transistor Q21 is turned on by the power supply voltage VCC supplied through the resistor RS1 and the resistor RG21, the transistor Q23 is turned on by the power supply voltage VCC supplied through the resistor RS3 and the resistor RG23, and the transistor Q221 is turned on by the power supply voltage VCC supplied through the resistor RS5 and the resistor RG221. When the transistor Q21, the transistor Q23, and the transistor Q221 are turned on, the resistor R21, the resistor R23, and the capacitor C22 are connected in parallel to the second power transistor Q2.

By the turn-on of the transistor Q21, the transistor Q23, and the transistor Q221, the resistance value of the snubber circuit 120 may be a parallel synthesis resistance value of the resistor R21 and the resistor R23, and the capacitance of the snubber circuit 120 may be determined as the capacitance of the capacitor C22.

FIG. 7 is a circuit diagram illustrating an example of a resistance box according to an exemplary embodiment.

In the example of FIG. 7, the selection resistor RS1 is included in the individual resistance box 21, the selection resistor RS5 is included in the individual resistance box 25, the selection resistor RS6 is included in the individual resistance box 26, and the selection resistor is not included in the remaining individual resistance boxes 22 to 24.

The power supply voltage VCC supplied to the resistance box 20 may supply a current to a corresponding selection terminal (e.g., P11, P15, and P16) among the plurality of selection terminals P11 to P16 through an individual resistance box (e.g., 21, 25, and 26) including a selection resistor among the plurality of individual resistance boxes 21 to 26.

In the converter 1 using the snubber circuit 120 and the resistance box 20 of FIGS. 4 and 7, the transistor Q21 is turned on by the power supply voltage VCC supplied through the resistor RS1 and the resistor RG21, the transistor Q221 is turned on by the power supply voltage VCC supplied through the resistor RS5 and the resistor RG221, and the transistor Q231 is turned on by the power supply voltage VCC supplied through the resistor RS6 and the resistor RG231. When the transistor Q21, the transistor Q221, and the transistor Q231 are turned on, the resistor R21, the capacitor C22, and the capacitor C23 are connected in parallel to the second power transistor Q2.

By the turn-on of the transistor Q21, the transistor Q221, and the transistor Q231, the resistance value of the snubber circuit 120 may be the resistance value of the resistor R21, and the capacitance of the snubber circuit 120 may be determined as the parallel synthesis capacitance of the capacitor C22 and the capacitor C23.

The snubber circuit 120 may include a plurality of resistors as illustrated in FIGS. 4 and 6, or may include a plurality of capacitors as illustrated in FIGS. 4 and 7. Alternatively, the snubber circuit 120 may include a resistance box in which the resistance box illustrated in FIG. 6 and the resistance box illustrated in FIG. 7 are combined to include a plurality of resistors and a plurality of capacitors.

Through the snubber circuit 120 according to an exemplary embodiment, noise that may be generated in the second power transistor Q2 may be reduced, and a snubber value of the snubber circuit 120 installed in the IC 10 may be adjusted according to a configuration of a selection resistor included in the resistance box 20 located outside the IC 10. The snubber value may be adjusted outside the IC 10 to reduce the debugging time for noise removal.

Although the exemplary embodiments of the present invention have been described in detail, the scope of the present invention is not limited thereto, and various modifications and improvements made by those skilled in the art to which the present invention belongs also belong to the scope of the present invention.

DESCRIPTION OF SYMBOLS

1: Converter
10: Integrated Circuit
110: Switch Control Circuit
120: Snubber Circuit
121: First Snubber
122: Second Snubber
123: Third Snubber
20: Resistance Box
21, 22, 23, 24, 25, 26: Individual Resistance Boxes
30: Output Unit

The invention claimed is:

1. An electric power converter comprising:
an integrated circuit including at least one power transistor and a snubber circuit connected in parallel to the at least one power transistor; and
a selection resistor connected between a power supply voltage supplied to the integrated circuit and the snubber circuit,
wherein the snubber circuit includes at least two snubbers, and
wherein each of the at least two snubbers includes a resistor, a first transistor, and a capacitor connected in series, and the selection resistor is connected to a gate of the first transistor of any one of the at least two snubbers.

2. The electric power converter of claim 1, wherein:
the first transistor of any one of the at least two snubbers is turned on by the power supply voltage supplied through the selection resistor.

3. The electric power converter of claim 2, wherein:
the first transistor of the remaining snubber other than the any one of the at least two snubbers is turned off.

4. The electric power converter of claim 1, wherein:
the integrated circuit further includes a switch control circuit configured to receive the power supply voltage and control a switching operation of the at least one power transistor.

5. An electric power converter comprising:
an integrated circuit including at least one power transistor and a snubber circuit connected in parallel with the at least one power transistor; and
at least two selection resistors connected between a power supply voltage supplied to the integrated circuit and the snubber circuit,
wherein the snubber circuit includes:
at least two resistors,
at least two first transistors connected in series with each of the at least two resistors, respectively,
at least two capacitors, and
at least two second transistors connected in series with each of the at least two capacitors, respectively, and
wherein a first selection resistor of the at least two selection resistors is connected to a gate of the first transistor connected in series with any one of the at least two resistors, and a second selection resistor of the at least two selection resistors is connected to a gate of the second transistor connected in series with any one of the at least two capacitors.

6. The electric power converter of claim 5, wherein:
the first transistor connected in series to any one of the at least two resistors is turned on by the power supply voltage supplied through the first selection resistor, and the second transistor connected in series to any one of the at least two capacitors is turned on by the power supply voltage supplied through the second selection resistor.

7. The electric power converter of claim 6, wherein:
the first transistor connected in series to the remaining resistor other than any one of the at least two resistors is turned off, and the second transistor connected in series to the remaining capacitor other than any one of the at least two capacitors is turned off.

8. The electric power converter of claim 5, wherein:
the integrated circuit further includes a switch control circuit configured to receive the power supply voltage to control the at least one power transistor.

9. The electric power converter of claim 5, wherein:
the at least two selection resistors further include a third selection resistor that is connected to a gate of the first transistor connected in series to another one of the at least two resistors, and
a resistance value of the snubber circuit is a parallel synthesis resistance of one of the at least two resistors and another one.

10. The electric power converter of claim 5, wherein:
the at least two selection resistors further include a third selection resistor that is connected to a gate of the second transistor connected in series to another one of the at least two capacitors, and
a capacitance value of the snubber circuit is a parallel synthesis capacitance of one of the at least two capacitors and another one.

11. The electric power converter of claim 5, wherein the electric power converter is a DC-DC (direct current-direct current) converter.

12. The electric power converter of claim 1, wherein the electric power converter is a DC-DC (direct current-direct current) converter.

* * * * *